United States Patent
Chen et al.

(10) Patent No.: US 12,499,555 B2
(45) Date of Patent: Dec. 16, 2025

(54) SYSTEMS AND METHODS FOR EFFICIENT VIDEO INSTANCE SEGMENTATION FOR VEHICLES USING EDGE COMPUTING

(71) Applicant: Toyota Motor Engineering & Manufacturing North America, Inc., Plano, TX (US)

(72) Inventors: Yitao Chen, Tempe, AZ (US); Dawei Chen, Milpitas, CA (US); Kyungtae Han, Palo Alto, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 325 days.

(21) Appl. No.: 18/227,453

(22) Filed: Jul. 28, 2023

(65) Prior Publication Data

US 2025/0037285 A1    Jan. 30, 2025

(51) Int. Cl.
*G06V 10/764*    (2022.01)
*G06T 7/12*    (2017.01)
(Continued)

(52) U.S. Cl.
CPC .............. *G06T 7/12* (2017.01); *G06V 10/761* (2022.01); *G06V 10/764* (2022.01); *G06V 20/56* (2022.01); *G06T 2207/20081* (2013.01)

(58) Field of Classification Search
None
See application file for complete search history.

(56) References Cited

U.S. PATENT DOCUMENTS 10,229,505 B2 *  3/2019  Ding .................... G06T 7/20
12,299,997 B1 *  5/2025  Ghaderi ............... G01S 17/86
(Continued)

FOREIGN PATENT DOCUMENTS

CN    111104885 A    5/2020
CN    113920490 A    1/2022
(Continued)

OTHER PUBLICATIONS

Shaohua Wan, et al., "Edge computing enabled video segmentation for real-time traffic monitoring in internet of vehicles," Journal Article; Pattern Recognition, vol. 121, No. 108146, Jan. 2022. URL: https://www.sciencedirect.com/science/article/abs/pii/S0031320321003332.
(Continued)

*Primary Examiner* — Tsung Yin Tsai
(74) *Attorney, Agent, or Firm* — Dinsmore & Shohl LLP

(57) ABSTRACT

A method for video instance segmentation is provided. The method includes inputting a plurality of video frames collected by a sensor of a vehicle to a trained machine learning model to obtain an n-th output from an n-th layer of the trained machine learning model and an n+1-st output from an n+1-st layer of the trained machine learning model, the trained machine learning model comprising a deep learning model and early-exit subnets, and in response to determining that a difference between the n-th output and the n+1-st output is less than a threshold value, controlling the vehicle based on the n+1-st output, the n+1-st output includes information about instances in the plurality of video frames.

20 Claims, 7 Drawing Sheets

(51) Int. Cl.
*G06V 10/74* (2022.01)
*G06V 20/56* (2022.01)

(56) References Cited

U.S. PATENT DOCUMENTS

| | | | |
|---|---|---|---|
| 2018/0005033 A1* | 1/2018 | Ding | G06T 7/254 |
| 2018/0005384 A1* | 1/2018 | Ding | G06V 20/56 |
| 2021/0019627 A1* | 1/2021 | Zhang | G06T 7/246 |
| 2022/0032933 A1 | 2/2022 | Wang et al. | |
| 2022/0041166 A1 | 2/2022 | Tiwari et al. | |
| 2022/0180643 A1* | 6/2022 | Retterath | G06V 10/761 |
| 2023/0132421 A1* | 5/2023 | Jeon | G06V 10/70 |

FOREIGN PATENT DOCUMENTS

| | | |
|---|---|---|
| CN | 114596532 A | 6/2022 |
| CN | 114627077 A | 6/2022 |

OTHER PUBLICATIONS

Wangchunshu Zhou, et al., "BERT Loses Patience: Fast and Robust Inference with Early Exit," Paper; 34th Conference on Neural Information Processing Systems (NeurIPS 2020), Vancouver, Canada. URL: https://proceedings.neurips.cc/paper/2020/file/d4dd111a4fd973394238aca5c05bebe3-Paper.pdf.

Surat Teerapittayanon, et al., "BranchyNet: Fast Inference via Early Exiting from Deep Neural Networks," Article Neural and Evolutionary Computing (cs.NE); Computer Vision and Pattern Recognition (cs.CV); Machine Learning (cs.LG), Sep. 6, 2017. URL: https://arxiv.org/abs/1709.01686.

* cited by examiner

SYSTEMS AND METHODS FOR EFFICIENT VIDEO INSTANCE SEGMENTATION FOR VEHICLES USING EDGE COMPUTING

TECHNICAL FIELD

The present disclosure relates to systems and methods for video instance segmentation, more specifically, to systems and methods for video instance segmentation using a machine learning model including early-exit subnets trained by an edge server.

BACKGROUND

In order to identify and/or classify objects by a vehicle, the vehicle processes images captured by the vehicle to identify any object in the captured image. Video-based solutions and image-based solutions may be used for identifying objects. Videos carry rich information including spatial information and temporal information compared to images. Video-based solutions exploit temporal information to improve existing approaches from image domain. Real-time video instance segmentation is crucial for connected vehicles to understand driving scenes. However, conventional models are not fast enough to process video data in real time because vehicles have constrained computing units and the size of videos is too big to send to a cloud server for further processing.

Accordingly, a need exists for a system that allows vehicles to analyze video frames to obtain instance segmentation in real-time.

SUMMARY

The present disclosure provides systems and methods for video instance segmentation using a machine learning model including early-exit subnets trained by an edge server.

In one embodiment, a method for video instance segmentation is provided. The method includes inputting a plurality of video frames collected by a sensor of a vehicle to a trained machine learning model to obtain an n-th output from an n-th layer of the trained machine learning model and an n+1-st output from an n+1-st layer of the trained machine learning model, the trained machine learning model comprising a deep learning model and early-exit subnets, and in response to determining that a difference between the n-th output and the n+1-st output is less than a threshold value, controlling the vehicle based on the n+1-st output, the n+1-st output includes information about instances in the plurality of video frames.

In another embodiment, a vehicle includes a sensor configured to collect a plurality of video frames, and a controller. The controller is programmed to: input the plurality of video frames collected by the sensor to a trained machine learning model to obtain an n-th output from an n-th layer of the trained machine learning model and an n+1-st output from an n+1-st layer of the trained machine learning model, the trained machine learning model comprising a deep learning model and early-exit subnets; and in response to determining that a difference between the n-th output and the n+1-st output is less than a threshold value, control the vehicle based on the n+1-st output, the n+1-st output includes information about instances in the plurality of video frames.

In another embodiment, a system for video instance segmentation is provided. The system includes a server and a vehicle. The vehicle includes a sensor configured to collect a plurality of video frames, and a processor programmed to: input the plurality of video frames collected by the sensor to a trained machine learning model to obtain an n-th output from an n-th layer of the trained machine learning model and an n+1-st output from an n+1-st layer of the trained machine learning model, the trained machine learning model comprising a deep learning model and early-exit subnets, and in response to determining that a difference between the n-th output and the n+1-st output is less than a threshold value, control the vehicle based on the n+1-st output, the n+1-st output includes information about instances in the plurality of video frames.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include temporal-aware efficient video instance segmentation for edge computing. According to the embodiments, the present system includes an edge server that trains a machine learning model for instance segmentation and a vehicle that receives the model for instance segmentation. The model may include a deep learning model and early-exit subnets. The edge server trains an initial machine learning model by training the deep learning model of the initial machine learning model using a training data set including a plurality of video frames as input and instance segmentation masks as output, and training the early-exit subnets of the initial machine learning model using a training data set including a plurality of video frames as input and instance segmentation masks as output. The vehicle collects and preprocess video data collected by the sensors of the vehicle and inputs the processed video data to the trained model to obtain instance segmentation outputs for inferring objects external to the vehicle.

The present system extracts temporal information with multiple frames and use stored past-frames to produce temporal information. The present system utilizes a model for instance segmentation that includes a transformer-based model and early-exit subnets. The present system improves efficiency of instance segmentation of video frames by leveraging early-exit subnets that allow similarity score-based early-exit. The present system allows vehicles to analyze video frames to obtain instance segmentation in real-time.

Figure 1A:
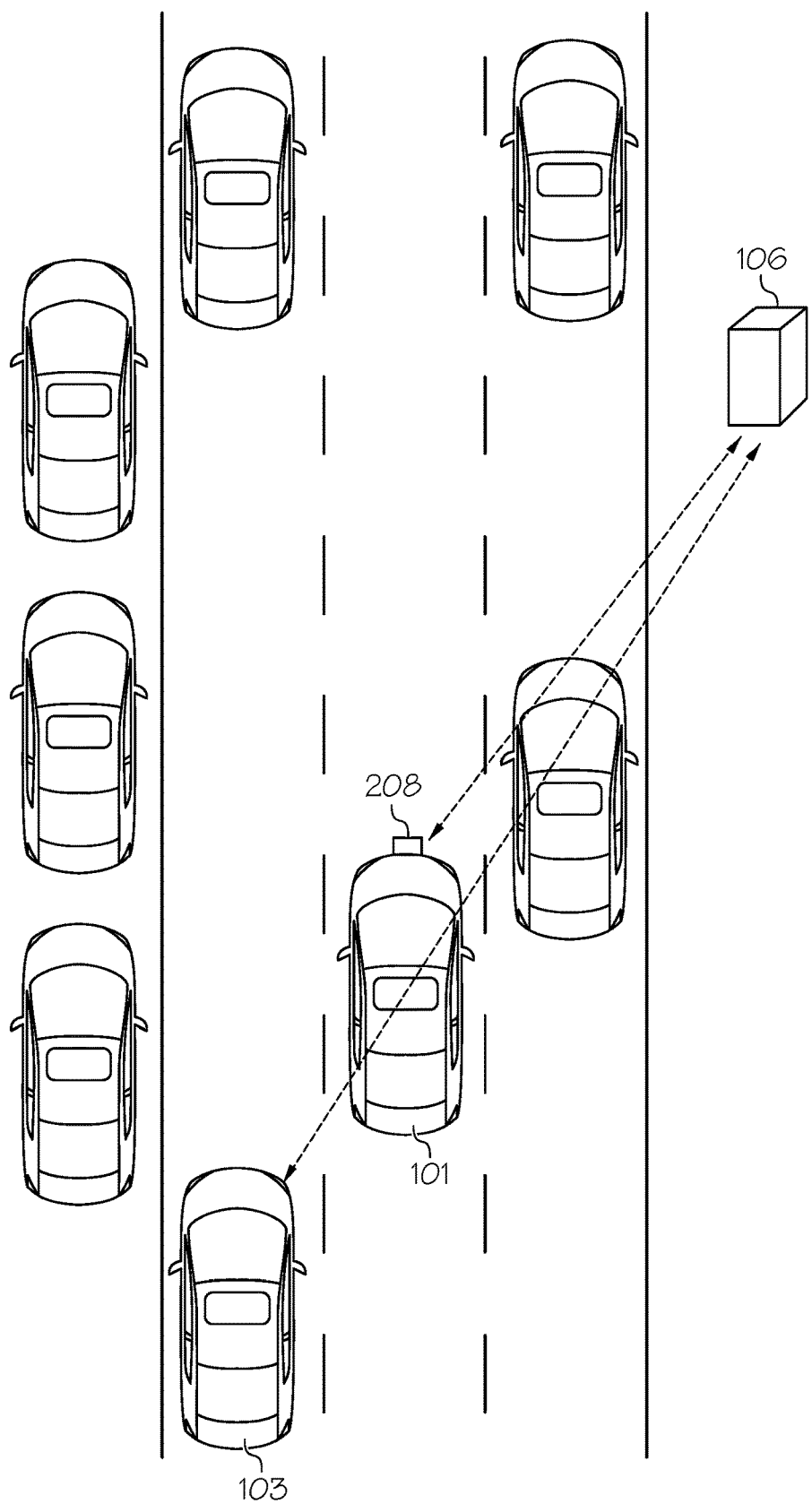
FIG. 1A schematically depicts a system for temporal-aware efficient video instance segmentation for edge computing, in accordance with one or more embodiments shown and described herewith.

FIG. 1A schematically depicts a system for temporal-aware efficient video instance segmentation for edge computing, in accordance with one or more embodiments shown and described herewith.

The system includes a plurality of vehicles including vehicles 101 and 103 and an edge server 106. Each of the vehicles 101 and 103 may be an automobile or any other passenger or non-passenger vehicle such as, for example, a terrestrial, aquatic, and/or airborne vehicle. Each of the vehicles 101 and 103 may be an autonomous vehicle that navigates its environment with limited human input or without human input. Each of the vehicles 101 and 103 may drive on a road and perform vision-based lane centering, e.g., using a sensor. Each of the vehicles 101 and 103 may include actuators for driving the vehicle, such as a motor, an engine, or any other powertrain.

The edge server 106 may store a model for instance segmentation of video frames. The model may include an image processing model, an object perception model, an object classification model, or any other model that may be utilized by vehicles in operating the vehicles. The model may be a machine learning model including, but not limited to, supervised learning models such as neural networks, recurrent neural networks, transformer, decision trees, linear regression, and support vector machines, unsupervised learning models such as Hidden Markov models, k-means, hierarchical clustering, and Gaussian mixture models, and reinforcement learning models such as temporal difference, deep adversarial networks, and Q-learning. In one example, the model may include a transformer-based model and a plurality of early exit subnets.

The edge server 106 may train the model based on a training data set including multiple video frames as input and instance segmentation masks as output. For example, the edge server 106 may receive video frames from vehicles in the vicinity of the edge server 106 such as the vehicles 101 and 103 and true instance segmentation masks corresponding to the video frames and train the model based on the video frames and the instance segmentation masks.

Figure 1B:
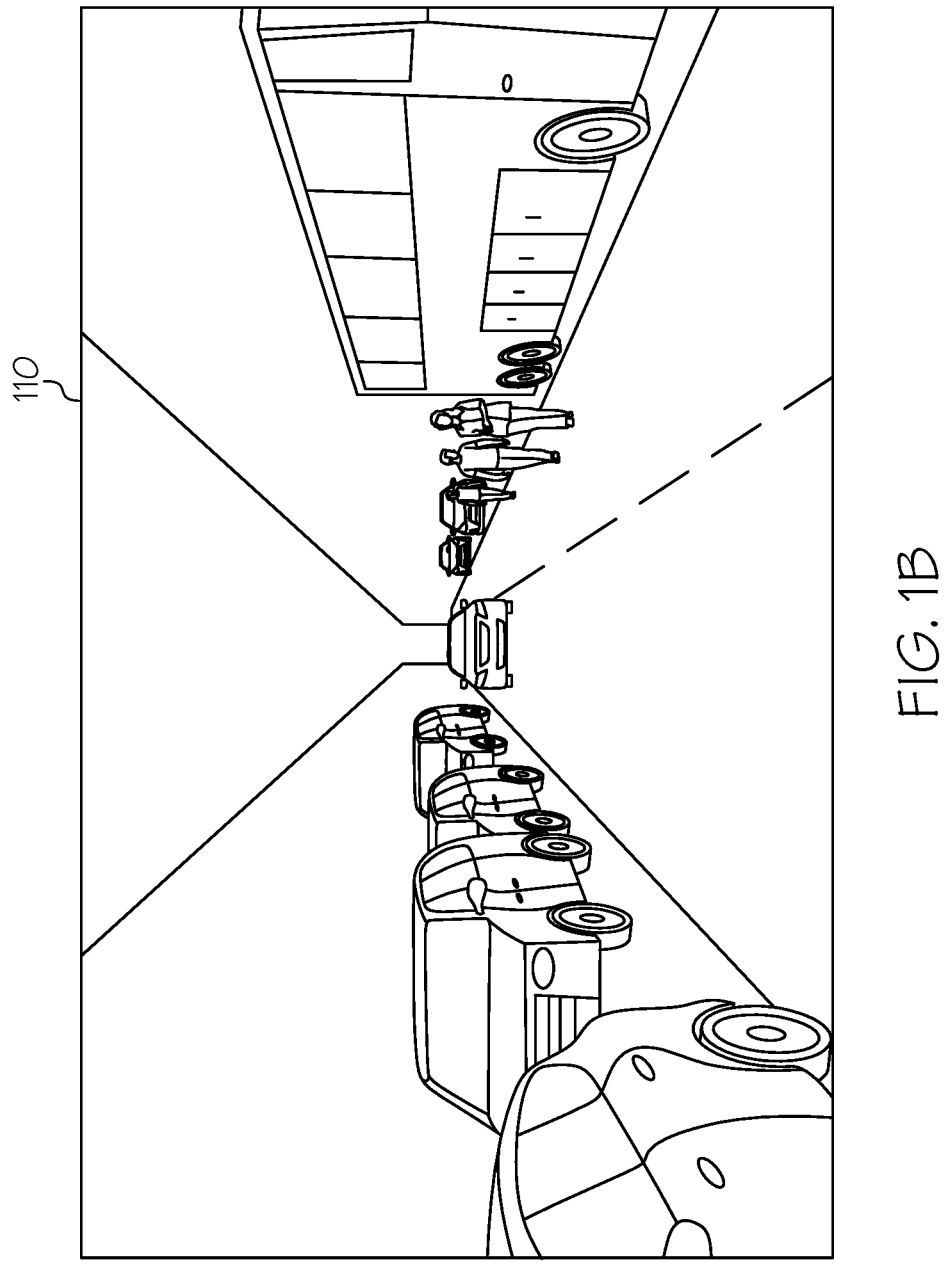
FIG. 1B illustrates an example video frame that captures the external view of the vehicle in FIG. 1A, in accordance with one or more embodiments shown and described herewith.

Each of the vehicles 101 and 103 may receive the trained model for instance segmentation from the edge server 106. For example, the vehicle 101 may receive the trained model for instance segmentation form the edge server 106. The sensor 208, e.g., a forward facing camera, may collect video data including video frames that captures the external view of the vehicle 101. FIG. 1B illustrates an example video frame 110 that captures the external view of the vehicle 101. The model for instance segmentation requires a certain number of video frames to perform instance segmentation. Once enough video frames are collected by the vehicle 101, the vehicle 101 inputs the collected video frames into the model for instance segmentation and obtains instance segmentation outputs such as the segmentation mask output 340 in FIG. 3B.

Figure 2:
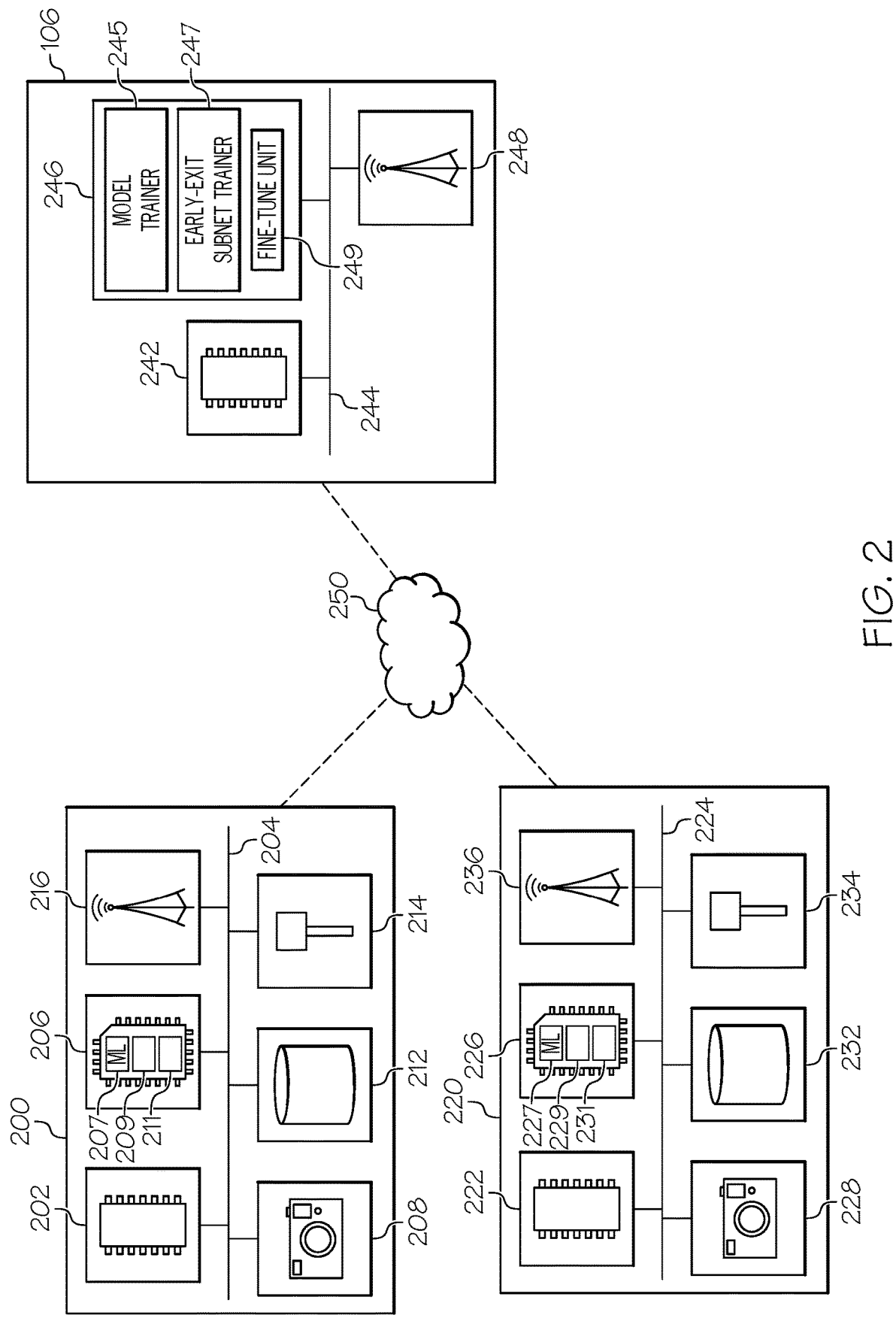
FIG. 2 depicts a schematic diagram of temporal-aware efficient video instance segmentation for edge computing, according to one or more embodiments shown and described herein.

FIG. 2 depicts a schematic diagram of temporal-aware efficient video instance segmentation for edge computing, according to one or more embodiments shown and described herein. The system includes a first vehicle system 200, a second vehicle system 220, and the edge server 106. While FIG. 2 depicts two vehicle systems, more than two vehicle systems may communicate with the edge server 106.

It is noted that, while the first vehicle system 200 and the second vehicle system 220 are depicted in isolation, each of the first vehicle system 200 and the second vehicle system 220 may be included within a vehicle in some embodiments, for example, respectively within the vehicles 101 and 103 of FIG. 1. In embodiments in which each of the first vehicle system 200 and the second vehicle system 220 is included within an edge node, the edge node may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the edge node may be an edge server that communicates with a plurality of vehicles in a region and communicates with a centralized server such as the edge server 106.

The first vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 202 along with the one or more memory modules 206 may operate as a controller for the first vehicle system 200.

The one or more memory modules 206 includes a machine learning (ML) model 207, a video data collector and preprocessor 209, and a model serving unit 211. Each of the ML model 207, the video data collector and preprocessor 209, and the model serving unit 211 may include, but not limited to, routines, subroutines, programs, objects, components, data structures, and the like for performing specific tasks or executing specific data types as will be described below.

The ML model 207 may be a trained model received from the edge server 106. The video data collector and preprocessor 209 collects video data and preprocesses the video data such as denoising, resizing, etc. to adjust the size of the video data. In embodiments, the video data collector and preprocessor 209 receives incoming video recorded by the sensors 208 of the first vehicle system 200, and preprocess the video to have reduced size of video data. The video data collector and preprocessor 209 determines whether enough pre-determined number of frames are collected. If enough frames are collected, then the video data collector and preprocessor 209 transmits the collected frames to the model serving unit 211. If enough frames are not collected, then the video data collector and preprocessor 209 continues collecting video data.

Regarding the collection of video frames, the video data collector and preprocessor 209 uses stored past-frames along with a newly obtained frame. For example, the ML model 207 uses three sequential frames as input to the ML model 207, if the video data collector and preprocessor 209 has collected three frames, and the video data collector and preprocessor 209 newly collected a fourth frame, the video data collector and preprocessor 209 selects the second, third, and fourth frames and sends them to the model serving unit 211 instead of waiting until the next three frames, i.e., fourth, fifth, and sixth frames, are all collected.

The model serving unit 211 of the vehicle receives frames from the video data collector and preprocessor 209 and inputs the frames into the ML model 207 received from the edge server 106. The ML model 207 may be, e.g., a model including the transformer-based model 310 and the early-exit subnets 320 in FIG. 3A. The model serving unit 211 calculates the output from the first layer of the ML model 207 and calculates the output from the second layer of the ML model 207. Then, the model serving unit 211 checks the similarity between the two outputs. In embodiments, the similarity may be determined based on the similarity of pixels of the two instance segmentation outputs. If the difference between the two outputs is less than a threshold value, for example, the difference in pixels of the two instance segmentation outputs is less than a threshold amount, then the model serving unit 211 stops calculating outputs of the layers of the ML model 207, and determines the output form the second layer of the ML model 207 as the final output. For example, if the percentage of the pixels that are different between the two instance segmentation outputs among the entire pixels is less than a threshold amount, then the model serving unit 211 stops calculating outputs of the layers of the ML model 207, and determines the output form the second layer of the ML model 207 as the final output.

In some embodiments, the similarity may be determined based on the similarity of boundaries of identified objects in the two instance segmentation outputs. For example, FIG. 3B illustrates an exemplary instance segmentation mask output 340. Specifically, the instance segmentation mask output 340 includes multiple objects and their segmentations. The instance segmentation mask output 340 includes objects 341, 342, 343, 344, 345, 346, 347, 348, 349, 350 and their boundaries. The model serving unit 211 calculates the boundaries of one instance segmentation output such as the boundaries of the objects 341, 342, 343, 344, 345, 346, 347, 348, 349, 350 in the instance segmentation mask output 340 and the boundaries of another instance segmentation output and determines the difference between the boundaries is less than a threshold amount.

In some embodiments, the similarity may be determined based on the similarity of instance identifications. For example, the instance segmentation mask output 340 may also include classifications of the objects such as car, but, pedestrians, and the like. The model serving unit 211 obtains a second instance segmentation output including the classifications of objects. The model serving unit 211 compares the classifications associated with the instance segmentation mask output 340 and the classifications associated with the second instance segmentation output.

If the difference between the two outputs is not less than a threshold value, the model serving unit 211 continues calculating the outputs of the remaining layers until the difference between two outputs of the consecutive layers is less than the threshold value. For example, if the difference in pixels of the two instance segmentation outputs is not less than a threshold amount, the model serving unit 211 calculates the output of the third layer of the ML model 207 and determines whether the difference between the output of the second layer of the ML model 207 and the output of the third layer of the ML model 207 is less than a threshold value.

Referring still to FIG. 2, the first vehicle system 200 comprises one or more sensors 208. The one or more sensors 208 may include a forward facing camera installed in a vehicle. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate a vehicle.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar may be used to obtain a rough depth and speed information for the view of the first vehicle system 200.

The first vehicle system 200 comprises a satellite antenna 214 coupled to the communication path 204 such that the communication path 204 communicatively couples the satellite antenna 214 to other modules of the first vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The first vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of a vehicle, e.g., the vehicle 101. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the first vehicle system 200 comprises network interface hardware 216 for communicatively coupling the first vehicle system 200 to the second vehicle system 220 and/or the edge server 106. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the first vehicle system 200 may transmit its data to the second vehicle system 220 or the edge server 106. For example, the network interface hardware 216 of the first vehicle system 200 may transmit vehicle data, location data, updated local model data and the like to the edge server 106.

The first vehicle system 200 may connect with one or more external vehicle systems (e.g., the second vehicle system 220) and/or external processing devices (e.g., the edge server 106) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the first vehicle system 200 may be communicatively coupled to the edge server 106 by the network 250. In one embodiment, the network 250 may include one or more computer networks (e.g., a personal area network, a local area network, or a wide area network), cellular networks, satellite networks and/or a global positioning system and combinations thereof. Accordingly, the first vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the second vehicle system 220 includes one or more processors 222, one or more memory modules 226, one or more sensors 228, one or more vehicle sensors 232, a satellite antenna 234, and a communication path 224 communicatively connected to the other components of the second vehicle system 220. The components of the second vehicle system 220 may be structurally similar to and have similar functions as the corresponding components of the first vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the communication path 224 corresponds to the communication path 204, the network interface hardware 236 corresponds to the network interface hardware 216, the ML model 227 corresponds to the ML model 207, a video data collector and preprocessor 229 corresponds to the video data collector and preprocessor 209, and a model serving unit 231 corresponds to the model serving unit 211.

Still referring to FIG. 2, the edge server 106 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The one or more memory modules 246 may include a model trainer 245, an early-exit subnet trainer 247 and a fine-tune unit 249. Each of the model trainer 245, the early-exit subnet trainer 247 and the fine-tune unit 249 may include, but is not limited to, routines, subroutines, programs, objects, components, data structures, and the like for performing specific tasks or executing specific data types as will be described below.

In embodiments, the model trainer 245 may initialize a model for instance segmentation that can be used by the edge server 106. The initial model may be a transformer-based model 310 in FIG. 3A. The model trainer 245 of the edge server 106 trains the initial model using training data set including multiple video frames as input and instance segmentation masks as output. Then, the model trainer 245 stores the pre-trained initial model.

Figure 3A:
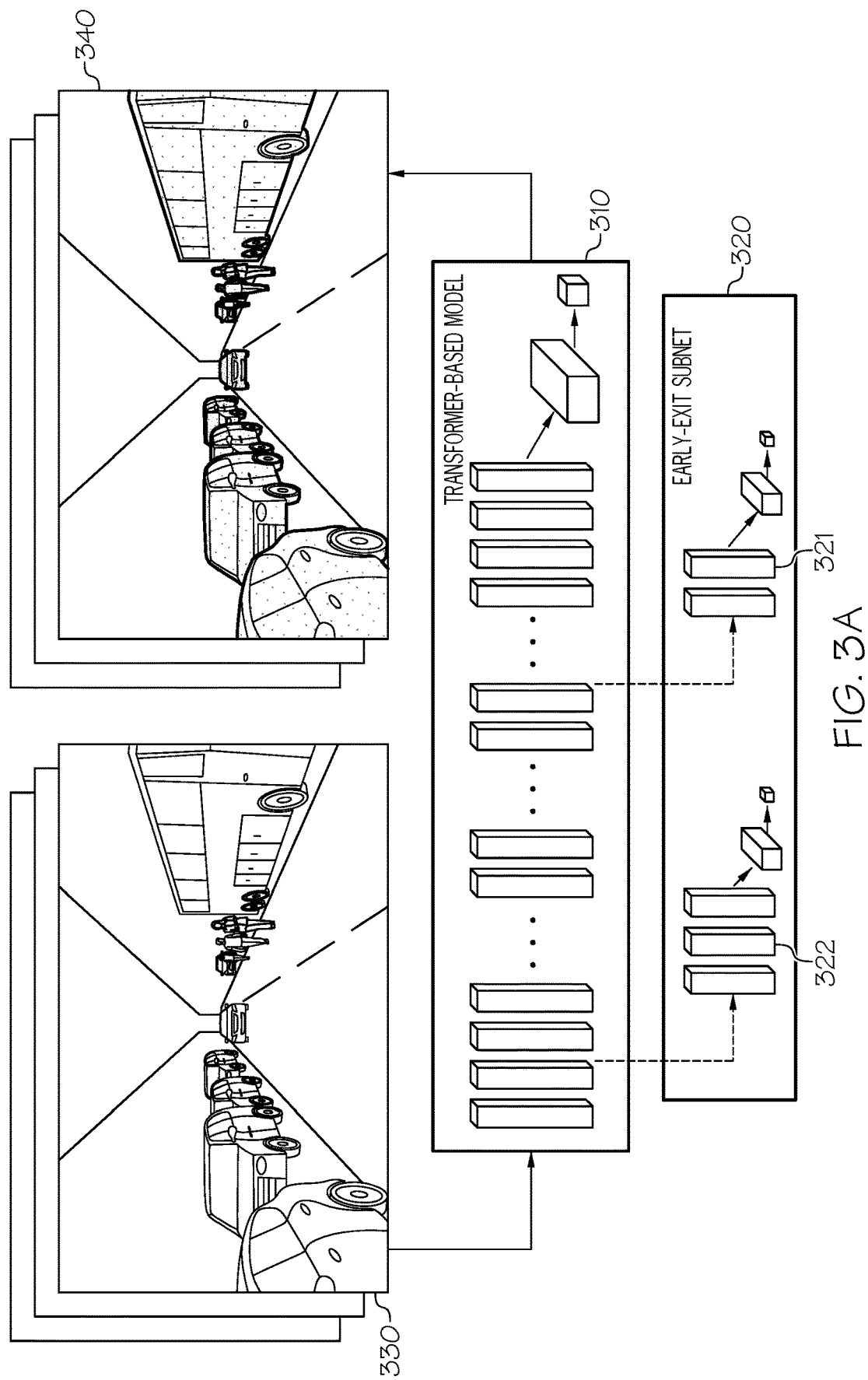
FIG. 3A depicts an exemplary machine learning model including a transformer-based model and early exit subnets, according to one or more embodiments shown and described herein.
Figure 3B:
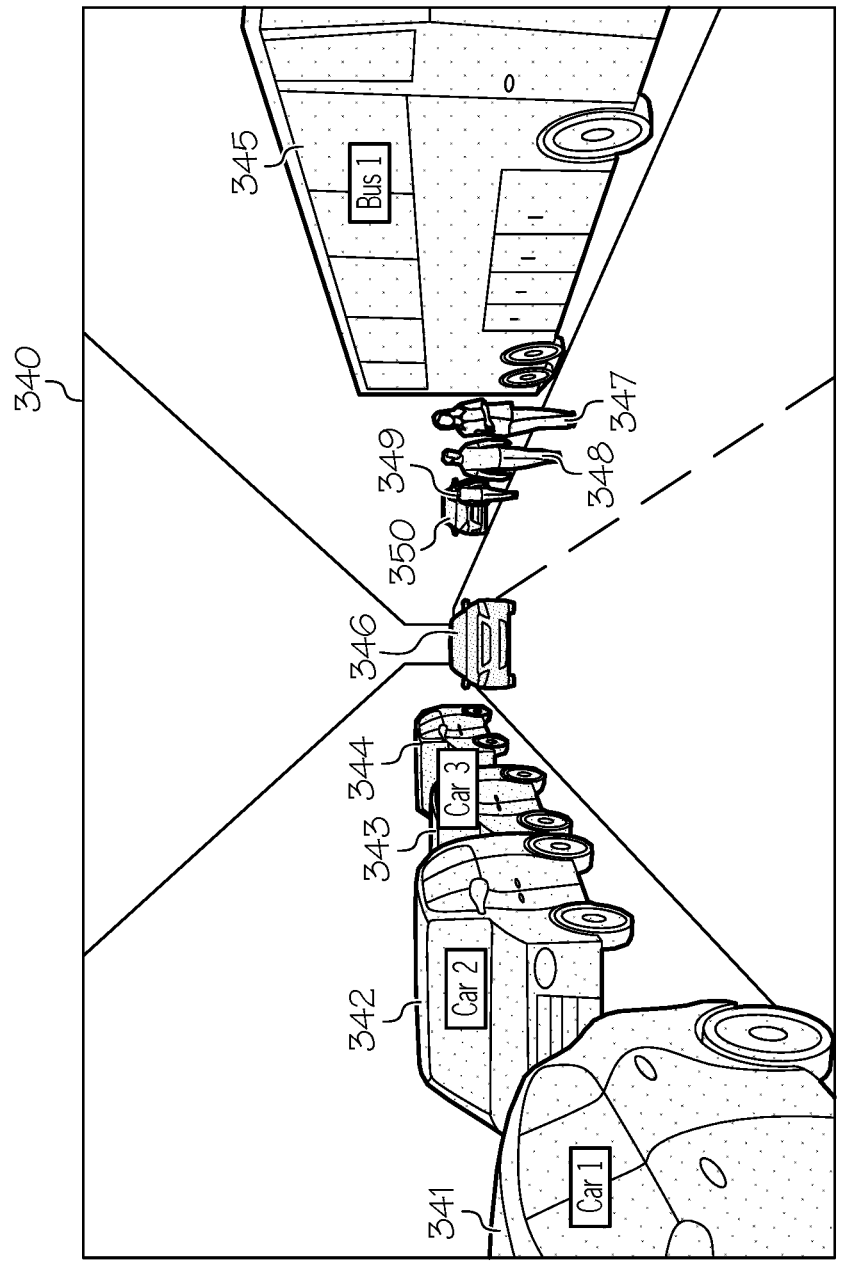
FIG. 3B illustrates an exemplary instance segmentation output, according to one or more embodiments shown and described herein.

The early-exit subnet trainer 247 of the edge server 106 trains early-exit subnets, e.g., the early-exit subnets 320 in FIG. 3A. For example, the first early-exit subnet on the left includes three layers. While FIG. 3A depicts that the first early-exit subnet includes three layers, the first early-exit subnet may include more than or less than three layers. The first early-exit subnet 322 receives an output from the second layer of the transformer-based model 310 and outputs an intermediate output. The second early-exit subnet 324 on the right includes two layers. While FIG. 3A depicts that the second early-exit subnet includes two layers, the second early-exit subnet may include more than or less than two layers. The second early-exit subnet 324 receives an output from corresponding layer of the transformer-based model and outputs an intermediate output. The early-exit subnets are trained using a training data set including multiple video frames as input and instance segmentation mask as output. While training the early-exit subnets, the parameters of the transformer-based model 310 may be updated as well. While FIG. 3A depicts two early-exit subnets 322 and 324, early-exit subnets may present at the output of each of the layers of the transformer-based model 310.

The fine-tune unit 249 of the edge server 106 updates the entire model including the transformer-based model 310 and the early-exit subnets 320 using a real-life data set. The deployment optimization of the edge server 106 optimizes the model including the transformer-based model 310 and the early-exit subnets 320, e.g., by removing redundant or unnecessary layers/parameters to increase efficiency of the model. Then, the edge server 106 transmits the optimized trained model to vehicles such as the first vehicle system 200 and the second vehicle system 220.

Figure 4:
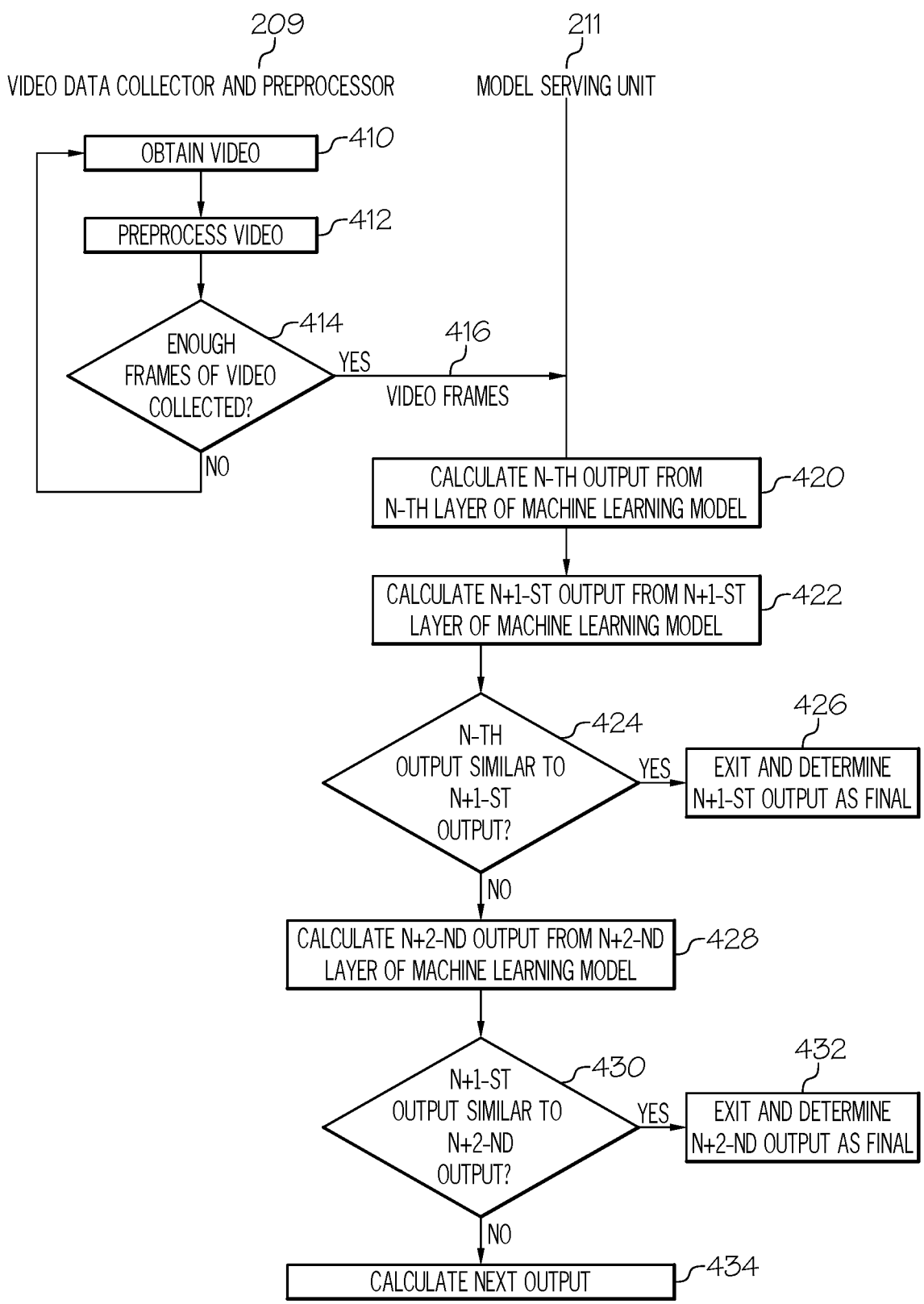
FIG. 4 depicts a flowchart for performing instance segmentation on video frames using a trained machine learning model received from an edge server, according to one or more embodiments shown and described herein.

FIG. 4 depicts a flowchart for performing instance segmentation on video frames using a trained machine learning model received from an edge server, according to one or more embodiments shown and described herein.

In step 410, the video data collector and preprocessor 209 of the vehicle 101 collects video data. For example, the video data collector and preprocessor receives incoming video recorded by sensors of the vehicle. In step 412, the video data collector and preprocessor 209 preprocesses the video data such as denoising, resizing, etc., to have reduced size of video data. In step 414, the video data collector and preprocessor 209 determines whether enough pre-determined number of frames are collected. If enough frames are collected, then the video data collector and preprocessor 209 transmits the collected frames to the model serving unit 211 in step 416. If enough frames are not collected yet, then the video data collector and preprocessor 209 returns to step 410 and continues collecting video data.

Regarding the collection of video frames, the video data collector and preprocessor 209 uses stored past-frames along with a newly obtained frame. For example, a trained machine learning model for instance segmentation uses three sequential frames as input to the trained machine learning model, if the video data collector and preprocessor 209 has collected three frames, and the video data collector and preprocessor 209 newly collected a fourth frame, the video data collector and preprocessor 209 selects the second, third, and fourth frames and sends them to the model serving unit 211 instead of waiting until the next three frames, i.e., fourth, fifth, and sixth frames, are all collected.

In step 420, the model serving unit 211 of the vehicle receives video frames from the video data collector and preprocessor 209 and inputs the video frames into the trained machine learning model received from the edge server 106 to calculate N-th output from N-th layer of the trained machine learning model received from the edge server 106. For example, the model serving unit 211 calculates the output from the first layer of the trained machine learning model. In step 422, the model serving unit 211 of the vehicle calculates N+1-st output from N+1-st layer of the machine learning model received from the edge server 106. For example, the model serving unit 211 calculates the output from the second layer of the trained machine learning model.

In step 424, the model serving unit 211 checks the similarity between the two outputs. The similarity may be determined based on the similarity of pixels of the two instance segmentation outputs and the similarity of instance identifications. If the two outputs are similar, then the model serving unit 211 exits and determines the N+1-st output as the final output in step 426. For example, if the difference in pixels of the two instance segmentation outputs is less than a threshold amount, then the model serving unit stops calculating outputs of the layers of the model, and determines the output from the second layer of the model as the final output.

If the two outputs are not similar, the model serving unit 211 calculates the next output, i.e., N+2-nd output from N+2-nd layer of the trained machine learning model in step 428. For example, if the difference in pixels of the two instance segmentation outputs is not less than a threshold amount, then the model serving unit calculates the output from the third layer of the trained machine learning model.

In step 430, the model serving unit 211 checks the similarity between N+1-st output and N+2-nd output. If the two outputs are similar, then the model serving unit 211 exits and determines the N+2-nd output as the final output in step 432. For example, if the difference in the pixels of the two instance segmentation outputs is less than a threshold amount, then the model serving unit stops calculating outputs of the layers of the model, and determines the output from the third layer of the trained machine learning model as the final output.

If the two outputs are not similar, the model serving unit 211 calculates the next output, i.e., N+3-rd output from N+3-rd layer of the trained machine learning model in step 434. The model serving unit continues calculating the outputs of the remaining layers until the difference between two outputs of the consecutive layers is less than the threshold value.

Figure 5:
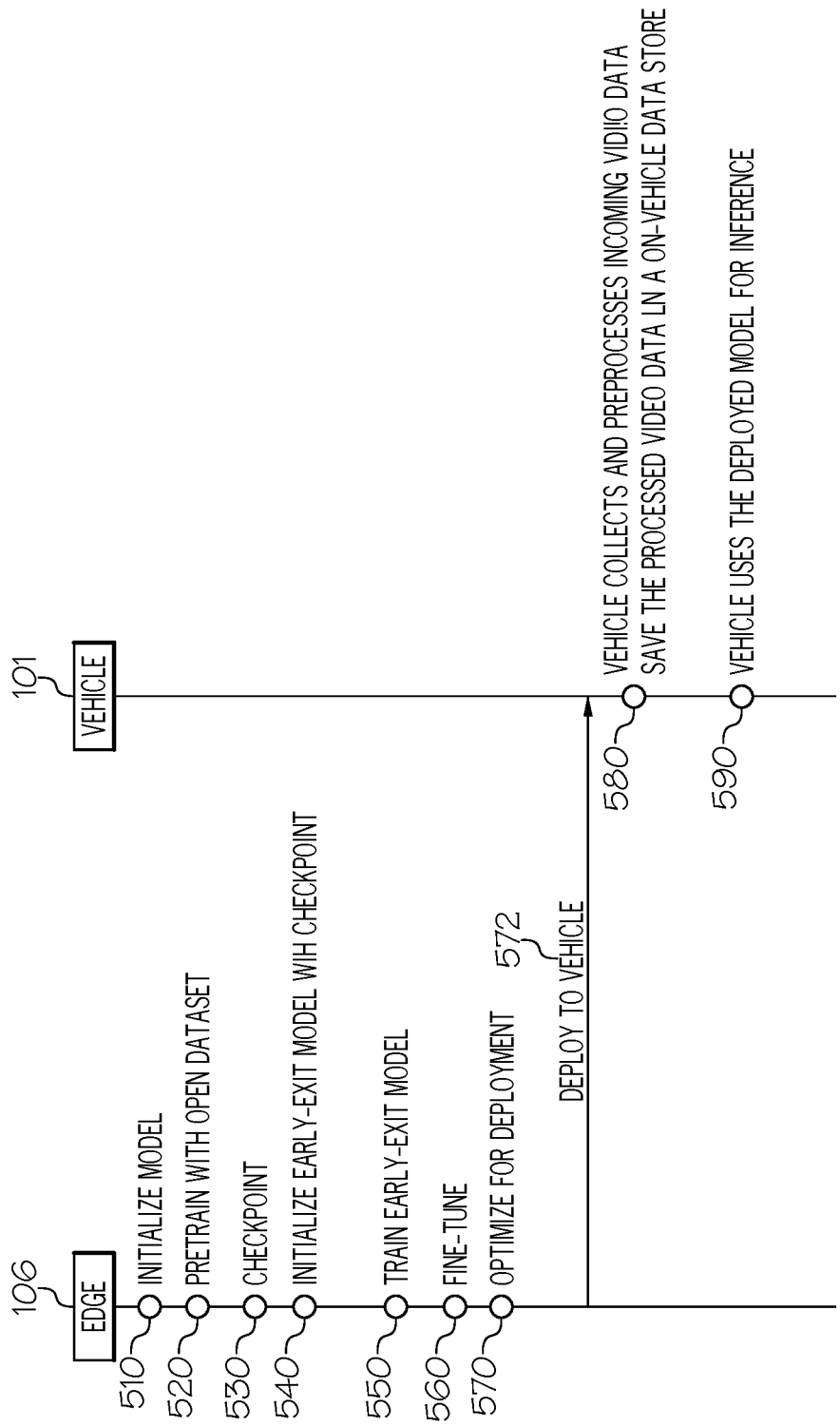
FIG. 5 depicts a sequence diagram for the present system, according to one or more embodiments shown and described herein.

FIG. 5 depicts a sequence diagram for the present system, according to one or more embodiments shown and described herein.

In FIG. 5, the system includes an edge server 106 and a vehicle 101. The system may include more than one vehicle. In step 510, the edge server 106 initializes a machine learning model for instance segmentation. In step 520, the edge server 106 pre-trains the initial machine learning model with an open dataset. In step 530, the edge server 106 checkpoints and saves the initially trained machine learning model. In step 540, the model initializer of the edge server 106 sets an initial machine learning model based on the machine learning model set by the checkpoint. In step 550, the early-exit subnet trainer of the edge server 106 trains early-exit subnets, e.g., the early-exit subnets 320 in FIG. 3A. In step 560, the fine-tune unit of the edge server 106 updates the entire machine learning model including the transformer-based model and the early-exit subnets using a real-life data set. In step 570, the edge server 106 optimizes the machine learning model, e.g., by removing redundant or unnecessary layers/parameters to increase efficiency of the machine learning model. Then, in step 572, the edge server 160 transmits the optimized trained machine learning model to the vehicle 101 and the communication unit of the vehicle 101 receives the optimized trained model from the edge server 160.

In step 580, the video data collector and preprocessor of the vehicle 101 collects video data and preprocesses the video data such as denoising, resizing, etc. The video data collector and preprocessor receives incoming video recorded by the sensors of the vehicle, and preprocess the video to have reduced size of video data. In step 590, the model serving unit of the vehicle 101 receives video frames from the video data collector and preprocessor and inputs the video frames into the machine learning model received from the edge server 106. The model serving unit calculates the output from the first layer of the machine learning model and calculates the output from the second layer of the machine learning model. Then, the model serving unit checks the similarity between the two outputs. The similarity may be determined based on the similarity of pixels of the two instance segmentation outputs and/or the similarity of instance identifications. If the difference between the two outputs is less than a threshold value, for example, the difference in pixels of the two instance segmentation outputs is less than a threshold amount, then the model serving unit stops calculating outputs of the layers of the machine learning model, and determines the output form the second layer of the machine learning model as the final output. If the difference between the two outputs is not less than a threshold value, the model serving unit continues calculating the outputs of the remaining layers until the difference between two outputs of the consecutive layers is less than the threshold value.

It should be understood that embodiments described herein are directed to a method and system for video instance segmentation is provided. The method includes inputting a plurality of video frames collected by a sensor of a vehicle to a trained machine learning model to obtain an n-th output from an n-th layer of the trained machine learning model and an n+1-st output from an n+1-st layer of the trained machine learning model, the trained machine learning model comprising a deep learning model and early-exit subnets, and in response to determining that a difference between the n-th output and the n+1-st output is less than a threshold value, controlling the vehicle based on the n+1-st output, the n+1-st output includes information about instances in the plurality of video frames.

The present method extracts temporal information with multiple frames and use stored past-frames to produce temporal information. The present method utilizes a model for instance segmentation that includes a transformer-based model and early-exit subnets. The present method improves efficiency of instance segmentation of video frames by leveraging early-exit subnets that allow similarity score-based early-exit. The present method allows vehicles to analyze video frames to obtain instance segmentation in real-time.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for video instance segmentation, the method comprising:
inputting a plurality of video frames collected by a sensor of a vehicle to a trained machine learning model to obtain an n-th output from an n-th layer of the trained machine learning model and an n+1-st output from an n+1-st layer of the trained machine learning model, the trained machine learning model comprising a deep learning model and early-exit subnets; and
in response to determining that a difference between the n-th output and the n+1-st output is less than a threshold value, controlling the vehicle based on the n+1-st output, the n+1-st output includes information about instances in the plurality of video frames.

2. The method of claim 1, wherein the deep learning model is a transformer-based model,
the n-th layer of the trained machine learning model is an n-th layer of the transformer-based model, and
the n+1-st layer of the trained machine learning model is an n+1-st layer of the transformer-based model.

3. The method of claim 1, further comprising:
preprocessing video data collected by the sensor of the vehicle; and
determining whether the plurality of video frames is the same as or greater than a threshold number; and
in response to determining that the plurality of video frames is the same as or greater than a threshold number, inputting the plurality of video frames to the trained machine learning model.

4. The method of claim 1, wherein each of the n-th output and the n+1-st output includes instance segmentation masks of the video frames, and
the difference between the n-th output and the n+1-st output is determined by comparing boundaries of instance segmentation masks in the n-th output and boundaries of instance segmentation masks in the n+1-st output.

5. The method of claim 1, wherein each of the n-th output and the n+1-st output includes instance segmentation of the video frames, and
the difference between the n-th output and the n+1-st output is determined by comparing classified objects in the n-th output and classified objects in the n+1-st output.

6. The method of claim 1, wherein each of the n-th output and the n+1-st output includes instance segmentation of the video frames, and
the difference between the n-th output and the n+1-st output is determined by comparing pixels of instance segmentation masks in the n-th output and pixels of instance segmentation masks in the n+1-st output.

7. The method of claim 1, further comprising:
training an initial machine learning model to obtain the trained machine learning model by:
training the deep learning model of the initial machine learning model using a training data set including a plurality of video frames as input and instance segmentation masks as output; and
training the early-exit subnets of the initial machine learning model using a training data set including a plurality of video frames as input and instance segmentation masks as output.

8. The method of claim 7, further comprising:
optimizing the trained initial machine learning model by removing redundant or unnecessary layers or parameters of the trained initial machine learning model.

9. A vehicle comprising:
a sensor configured to collect a plurality of video frames; and
a controller programmed to:
input the plurality of video frames collected by the sensor to a trained machine learning model to obtain an n-th output from an n-th layer of the trained machine learning model and an n+1-st output from an n+1-st layer of the trained machine learning model, the trained machine learning model comprising a deep learning model and early-exit subnets; and
in response to determining that a difference between the n-th output and the n+1-st output is less than a threshold value, control the vehicle based on the n+1-st output, the n+1-st output includes information about instances in the plurality of video frames.

10. The vehicle of claim 9, wherein the deep learning model is a transformer-based model,
the n-th layer of the trained machine learning model is an n-th layer of the transformer-based model, and
the n+1-st layer of the trained machine learning model is an n+1-st layer of the transformer-based model.

11. The vehicle of claim 9, wherein the controller is further programmed to:
preprocess video data collected by the sensor; and
determine whether the plurality of video frames is the same as or greater than a threshold number; and
in response to determining that the plurality of video frames is the same as or greater than a threshold number, input the plurality of video frames to the trained machine learning model.

12. The vehicle of claim 9, wherein each of the n-th output and the n+1-st output includes instance segmentation masks of the video frames, and
the difference between the n-th output and the n+1-st output is determined by comparing boundaries of instance segmentation masks in the n-th output and boundaries of instance segmentation masks in the n+1-st output.

13. The vehicle of claim 9, wherein each of the n-th output and the n+1-st output includes instance segmentation of the video frames, and
the difference between the n-th output and the n+1-st output is determined by comparing classified objects in the n-th output and classified objects in the n+1-st output.

14. The vehicle of claim 9, wherein each of the n-th output and the n+1-st output includes instance segmentation of the video frames, and
the difference between the n-th output and the n+1-st output is determined by comparing pixels of instance segmentation masks in the n-th output and pixels of instance segmentation masks in the n+1-st output.

15. The vehicle of claim 9, wherein the vehicle autonomously drives based on the n+1-st output.

16. A system comprising:
a server; and
a vehicle comprising:
a sensor configured to collect a plurality of video frames; and
a processor programmed to:
input the plurality of video frames collected by the sensor to a trained machine learning model to obtain an n-th output from an n-th layer of the trained machine learning model and an n+1-st output from an n+1-st layer of the trained machine learning model, the trained machine learning model comprising a deep learning model and early-exit subnets; and
in response to determining that a difference between the n-th output and the n+1-st output is less than a threshold value, control the vehicle based on the n+1-st output, the n+1-st output includes information about instances in the plurality of video frames.

17. The system of claim 16, wherein the server is further programmed to:
train an initial machine learning model to obtain the trained machine learning model by:
training the deep learning model of the initial machine learning model using a training data set including a plurality of video frames as input and instance segmentation masks as output; and
training the early-exit subnets of the initial machine learning model using a training data set including a plurality of video frames as input and instance segmentation masks as output.

18. The system of claim 16, wherein the server is programmed to:
- optimize the trained initial machine learning model by removing redundant or unnecessary layers or parameters of the trained initial machine learning model.

19. The system of claim 16, wherein the deep learning model is a transformer-based model,
- the n-th layer of the trained machine learning model is an n-th layer of the transformer-based model, and
- the n+1-st layer of the trained machine learning model is an n+1-st layer of the transformer-based model.

20. The system of claim 16, wherein each of the n-th output and the n+1-st output includes instance segmentation masks of the video frames, and
- the difference between the n-th output and the n+1-st output is determined by comparing boundaries of instance segmentation masks in the n-th output and boundaries of instance segmentation masks in the n+1-st output.

* * * * *